(12) United States Patent
Vishnevskij

(10) Patent No.: US 10,990,241 B2
(45) Date of Patent: Apr. 27, 2021

(54) RICH MEDIA ICON SYSTEM

(71) Applicant: Buxton Technology Enterprises Inc., Road Town (VG)

(72) Inventor: Kirill Vishnevskij, Road Town (VG)

( * ) Notice: Subject to any disclaimer, the term of this patent is extended or adjusted under 35 U.S.C. 154(b) by 0 days.

(21) Appl. No.: 16/020,655

(22) Filed: Jun. 27, 2018

(65) Prior Publication Data
US 2019/0004681 A1 Jan. 3, 2019

Related U.S. Application Data

(60) Provisional application No. 62/525,737, filed on Jun. 28, 2017.

(51) Int. Cl.
| | | |
|---|---|---|
| G06F 3/048 | (2013.01) | |
| G06F 3/0481 | (2013.01) | |
| G06F 3/0482 | (2013.01) | |
| H04L 29/06 | (2006.01) | |
| G06F 3/0484 | (2013.01) | |
| G06F 16/901 | (2019.01) | |
| G06F 16/951 | (2019.01) | |
| G06F 16/41 | (2019.01) | |

(52) U.S. Cl.
CPC ........ *G06F 3/04817* (2013.01); *G06F 3/0482* (2013.01); *G06F 3/04845* (2013.01); *G06F 16/41* (2019.01); *G06F 16/901* (2019.01); *G06F 16/951* (2019.01); *H04L 65/4084* (2013.01); *H04L 65/60* (2013.01)

(58) Field of Classification Search
CPC ....... G06F 3/04817; G06F 21/62; H04L 9/00; H04L 29/06; G11B 27/19
See application file for complete search history.

(56) References Cited

U.S. PATENT DOCUMENTS

| | | | | |
|---|---|---|---|---|
| 2004/0117822 A1* | 6/2004 | Karaoguz | ............ | H04H 20/106 725/37 |
| 2008/0034328 A1* | 2/2008 | Cahill | ............ | G06Q 30/02 715/855 |
| 2008/0120501 A1* | 5/2008 | Jannink | ............ | H04L 49/201 713/163 |
| 2009/0193338 A1* | 7/2009 | Fiatal | ............ | H04W 12/06 715/716 |
| 2010/0153848 A1* | 6/2010 | Saha | ............ | G06F 16/9562 715/721 |
| 2013/0151988 A1* | 6/2013 | Sorin | ............ | H04L 65/403 715/753 |
| 2014/0108141 A1* | 4/2014 | Zigler | ............ | G06Q 30/0255 705/14.53 |
| 2014/0115440 A1* | 4/2014 | Datar | ............ | G11B 27/11 715/230 |
| 2014/0250390 A1* | 9/2014 | Holmes | ............ | G06F 3/04817 715/760 |
| 2015/0020153 A1* | 1/2015 | Jang | ............ | H04L 63/101 726/1 |
| 2016/0042253 A1* | 2/2016 | Sawhney | ............ | G06F 16/50 382/190 |
| 2017/0255342 A1* | 9/2017 | Fontaine | ............ | G06F 3/0481 |
| 2017/0330598 A1* | 11/2017 | Choi | ............ | G11B 27/19 |

* cited by examiner

*Primary Examiner* — Rashawn N Tillery

(57) ABSTRACT

The present invention discloses a system for creation and engagement with rich media icons over a wireless network.

1 Claim, 10 Drawing Sheets

RICH MEDIA ICON SYSTEM

CROSS REFERENCE TO RELATED APPLICATIONS

This application claims priority to U.S. Provisional Application 62/525,737 entitle "RICH MEDIA ICON SYSTEM" and filed Jun. 28, 2017 which is hereby incorporated by reference in its entirety.

TECHNICAL FIELD

The present invention relates to the field of computer implemented methods and more specifically to the field of computer implemented methods for the purpose of displaying appropriate information on a mobile device platform.

BACKGROUND

In recent years, advances in technology surrounding means for mobile communications as well as the increased use of these devices has resulted in new and innovative ways for people to share information. This rise in mobile device use has resulted in a multitude of digital content including text, audio, video, and images. Many websites and applications allow users to store these digital media for display privately or publicly. For example, Flickr, Dropbox, Pinterest, Facebook, and Youtube, among others allow users to post and store their content for others to view.

Content delivery networks or CDN's comprising a logical grouping of front-end servers are often used to deliver content to the mobile devices of users in the network. Back-end servers may aggregate the data, store and analyze data, as well as search data. The front-end and back-end servers communicate with one another in order to process, send, and receive data to a multitude of users.

As devices have gotten more adequate at displaying high resolution images while retaining tactile functions such as touch-enabled screens, how information is displayed has changed throughout the years. These devices are no longer restrained to using simple text hyperlinks as a portal to information. Instead, rich media icons have become more prominent, as they allow for a relevant image to be displayed, with the hopes of enticing the user to select the image and engage with information contained therein.

SUMMARY OF THE INVENTION

This summary is provided to introduce a variety of concepts in a simplified form that is further disclosed in the detailed description of the invention. This summary is not intended to identify key or essential inventive concepts of the claimed subject matter, nor is it intended for determining the scope of the claimed subject matter.

Embodiments presented herein disclose a system and method for the creation, curation, and engagement with rich media icons over a graphic user interface. The system is comprised of a personal electronic device in communication with a network including at least one server, at least one memory, and at least one processor. The memory is coupled to the processor which receives an image and applies the image to an index of images. A user performs the steps of creating a media file and generating content related to the media file which they have created. The content is associated with the media file and index where it can be presented to a community of users.

A computer readable medium having computer executable instructions performs a plurality of steps via a processor. A user interface is provided to a community of users. The user interface includes a plurality of media files each presented as a selectable icon.

Moreover, in accordance with a preferred embodiment of the present invention, other aspects, advantages, and novel features of the present invention will become apparent from the following detailed description in conjunction with the drawings.

BRIEF DESCRIPTION OF THE DRAWINGS

A more complete understanding of the present invention, and the advantages and features thereof, will be more readily understood by reference to the following detailed description when considered in conjunction with the accompanying drawings wherein.

DETAILED DESCRIPTION

Figure 1:
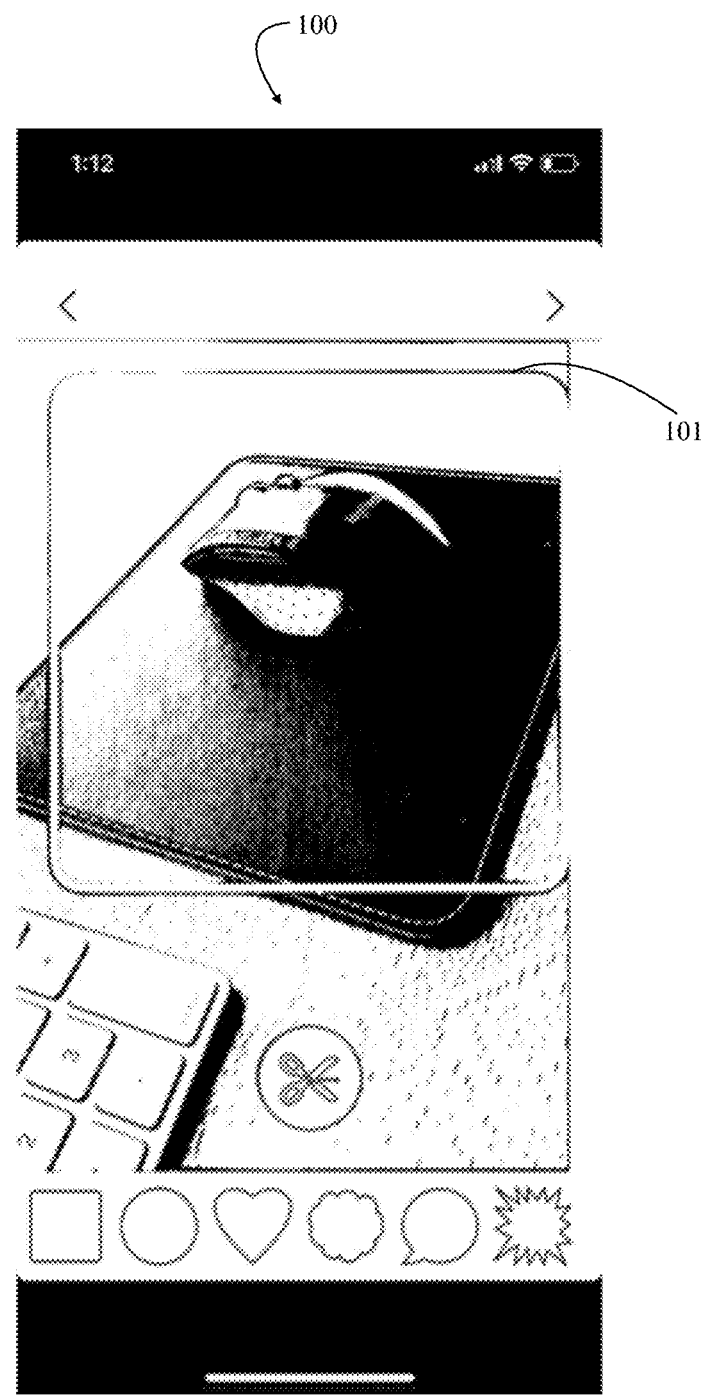
FIG. 1 illustrates a screenshot of the image capture interface, according to an embodiment of the present invention.

The specific details of the single embodiment or variety of embodiments described herein are to the described system and methods of use. Any specific details of the embodiments are used for demonstration purposes only and not unnecessary limitations or inferences are to be understood therefrom.

Any reference to "invention" within this document is a reference to an embodiment of a family of inventions, with no single embodiment including features that are necessarily included in all embodiments, unless otherwise stated. Furthermore, although there may be references to "advantage's" provided by some embodiments, other embodiments may not include those same advantages, or may include different advantages. Any advantages described herein are not to be construed as limiting to any of the claims.

Before describing in detail exemplary embodiments, it is noted that the embodiments reside primarily in combinations of components related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second" and the like, may be used solely to distinguish one entity or element from another entity or element without necessarily requiring or implying any physical or logical relationship or order between such entities or elements.

Figure 2:
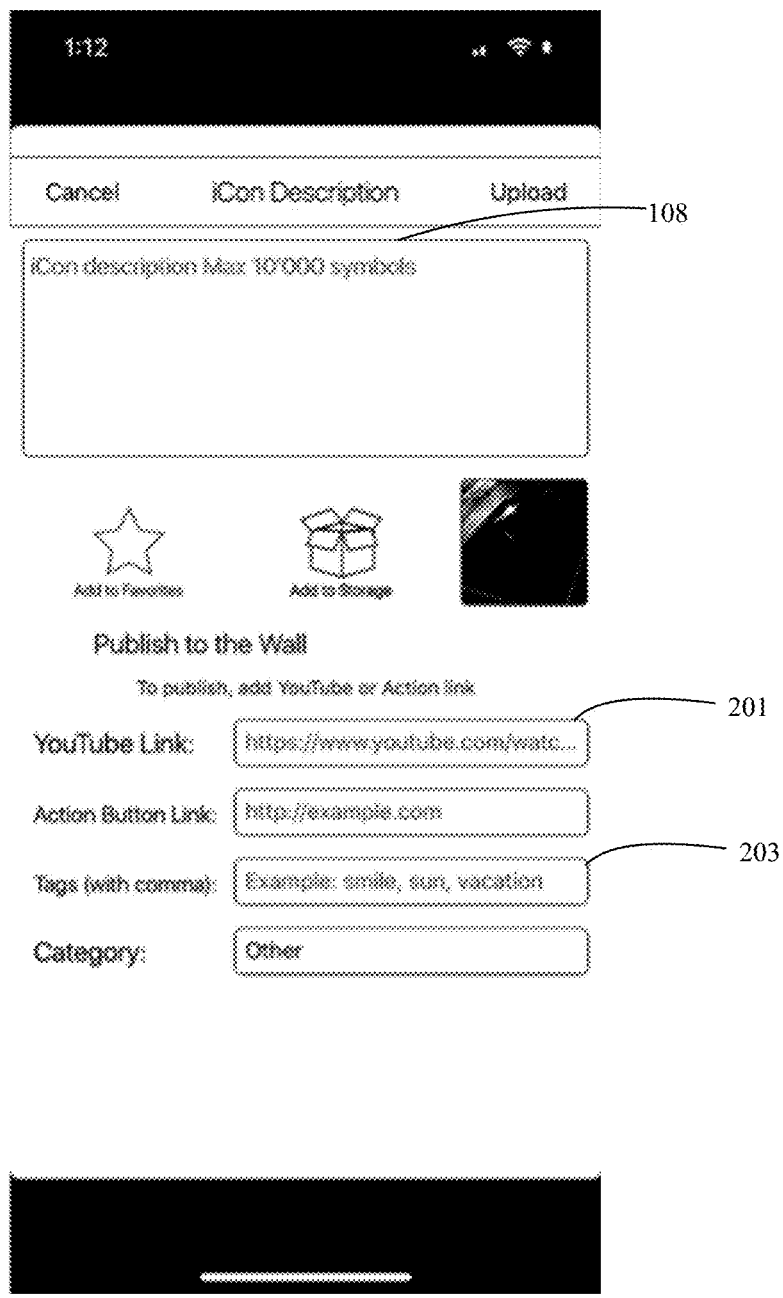
FIG. 2 illustrates a screenshot of the icon creation and description interface, according to an embodiment of the present invention.
Figure 3:
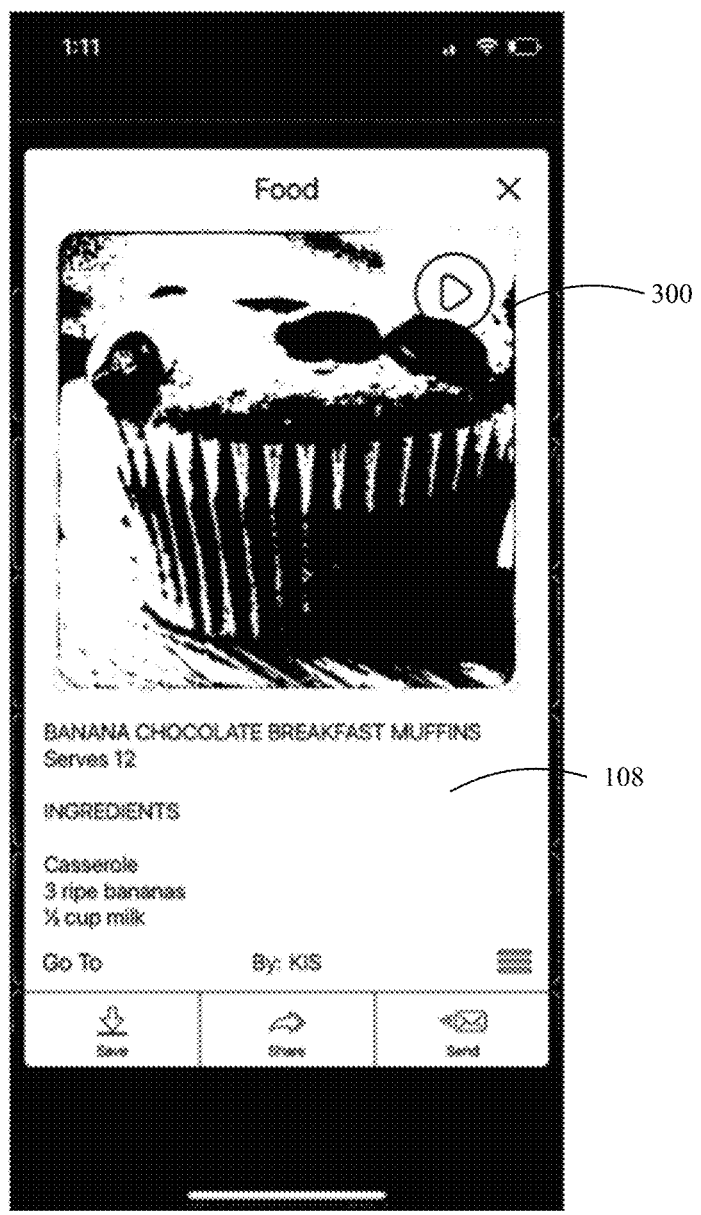
FIG. 3 illustrates a screenshot of a rich media icon interface, according to an embodiment of the present invention.

In general, the present invention includes a system for the presentation of information using user interface ("UI") 100 having substantially less clutter than UI's in prior art systems. The UI 100 consists of a plurality of rich media icons, each of which having at least one image 104 displayed thereon. Each rich media icon acts as a link to content stored therein. Content may include, but is not limited to text, video, imagery, audio, advertisements, among other media known in the social media and electronic display arts. An exemplary embodiment of the UI 100 can be seen in FIGS. 1-3.

A user may be presented with a graphical user interface via a client device. A client device may include, for example, personal computers, tablet computers, eBook reader devices, laptop computers, desktop computers, netbooks, personal digital assistants (PDA), portable gaming devices, wireless communication devices, such as smart phones or mobile handsets, set-top boxes, game consoles, cameras, audio recorders/players, or any combination thereof.

Utilizing a client device, a user may interact with the presented information, selecting objects of interest and/or performing other actions.

Each user device 1004 has a processor 1002, memory, display and image processing device. The device communicates with the user interface server via a wireless network 1000. The wireless network permits the sharing of information between users within the community.

The memory may also include a search module. The search module may be executable by the processor to implement one or more of the functions of the server system. In one implementation, the search service may represent instructions embodied in one or more software programs stored in the memory. In another implementation, the search service can represent hardware, software instructions, or a combination thereof.

Figure 10:
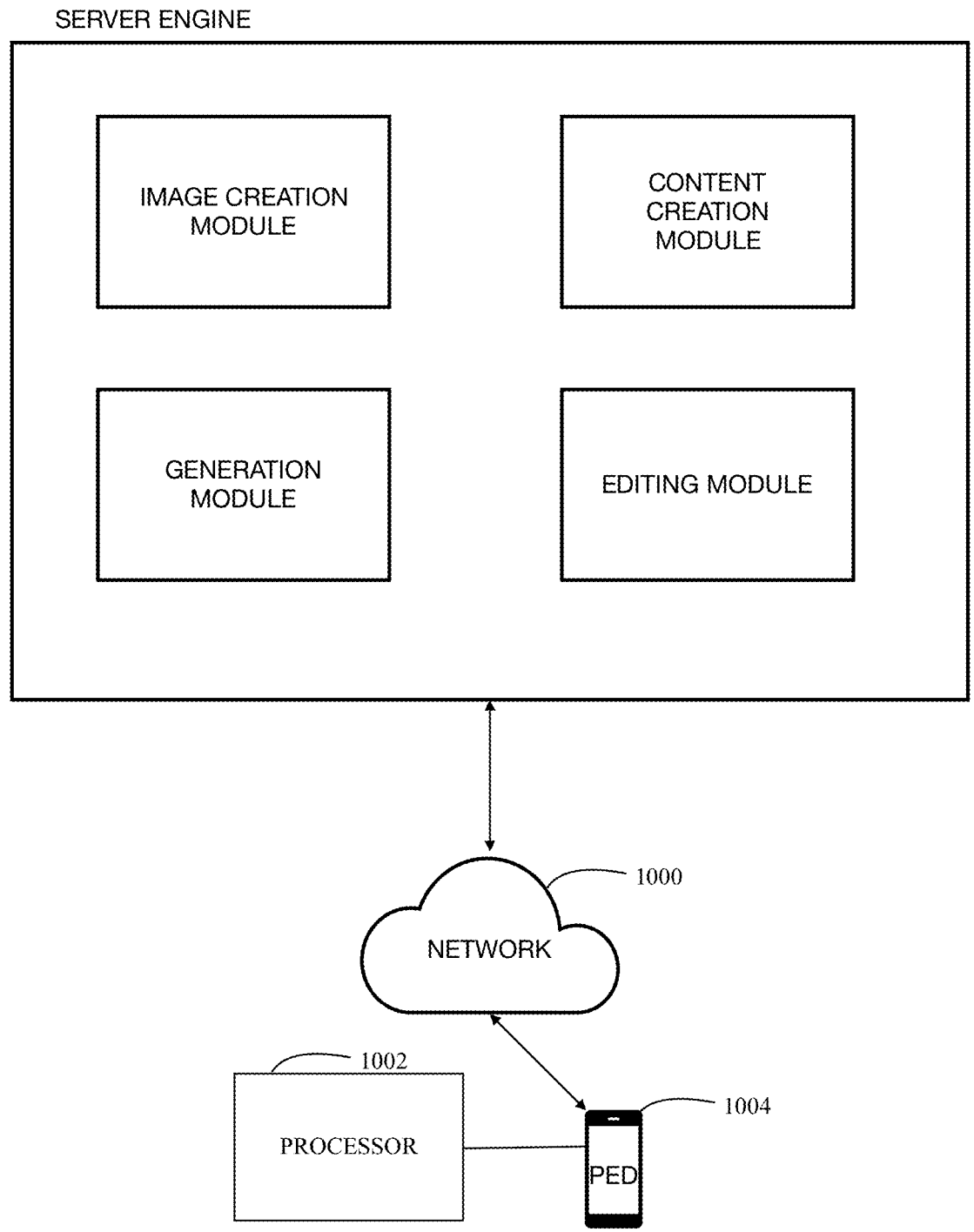
FIG. 10 illustrates a network and server architecture, according to an embodiment of the present invention.

The server system, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

FIG. 10 also illustrates a server engine having a plurality of modules operatively in communication thereto. Modules can include but are not limited to: an image creation module, facilitating the creation and sharing of images; a content creation module, to facilitate the creation of content related of the rich media icon; a generation module to generate material, content, search results, or other useful content to the user; and an editing module to facilitate the editing of content and images.

At any time, a rich media icon wall can be accessed by the user via a personal electronic device. The rich media icon wall contains a plurality of rich media icons, each of which act as a link to additional pathways to information.

The specific rich media icon that is displayed at a given time may rely on one or a combination of factors. These factors may include popularity, time published, and interests.

In an embodiment, and from the user's perspective, a plurality of screens, each of which having a number of options therein, are shown on a mobile device, or other form of digitally engageable graphic display. The user may select from a "chat" terminal, "iCon Wall" terminal, "edit favorites", "edit storage", and "edit my iCons" selection tabs. Content within each selection may include a title, one or more active elements, one or more images—including still or video—, and one or more descriptions in relation to the content therein. Each of these components may be embedded and selectable to transfer the user to additional portals of information and data.

In an embodiment, the chat terminal allows users to connect with one another throughout the network, either privately or publicly. Users may elect to send and receive rich media icons with one another, either directly through the message from icon details pop-up window, or using a customized keyboard having rich media icons in communication thereto.

In an embodiment, the "iCon Wall" may have a plurality of rich media icons displayed. The order, and theme of these may be customized by the user, or may dependent on user history, preferences, common search themes, anticipated interest, among other factors known in the arts.

In an embodiment, each rich media icon may contain a description 108 when selected. Also on this page, a "go to" link may be included. This link transfers the user to a built in browser in communication with the system. Further, the user may select the "author" of the link and be transferred to the author's page to view icons by the author, a profile, and an option to follow the author. The user may also be able to report prohibited materials, mark as spam, among other common functionalities known in the arts.

In an embodiment, the user may be able to save, store, share, and send specific rich media icons and data contained therein within the network as well as to external networks.

In an embodiment, the user may move icons between two or more keyboards. For example, the user may have two empty keyboards, one for a "Favorites" and one for "Storage". As the user engages with iCons while using the app, the user may save iCons to either the "Favorites" keyboard or "Storage" keyboard for rapid recall upon future use of the iCon. In an embodiment, users may transfer iCons from one keyboard to another as they desire.

In an embodiment, the user may edit only descriptions of the iCons which they themselves created.

In an embodiment, each user may be able to view media in a variety of ways such as full screen mode, half screen, among others known in the art.

System of User Creation of Rich Media Icon 300:

It is a goal of the present invention to permit users within the network to create, edit, share, and in other means engage in Rich Media Icon, not only as a consumer, but as an active redistribution of information. In an embodiment each user may select a "create iCon" terminal 113 wherein four options lie. The user may select from: 1. "Photo Library", "Take Photo", "Video Gallery", and "Cancel". Each option creates various options for the user.

Selecting "Photo Library" allows the user to create an icon using an image from a photo library on the user's device. Authorization to the user's locally stored photos will be requested. The user may then scan through images using existing software architecture, or scrolling and selecting means within the application. As an image is selected, the user may resize, reshape, and/or reconfigure the image to be viewed as they choose using the tool 101. Further, the user may edit/cut the image if the image is in the default square shape.

In an embodiment, as the user engages with the edit/cut functionality tool 101, the users input and modifications of the image are displayed in real time. Further, user may select an "eraser" function to remove visual characteristics from the image. The user may also engage in an "undo" button in order to delete the most recent edit by the user. One or more of the input buttons may contain an "inactivate" feature. In an embodiment, the "inactivate edit/cut" button becomes active only after the user creates with the "editing eraser" a closed loop, or connects at least two dots at the border of the image. In this case, clocking on the "edit/cut" button will bring the user to the next screen with the images treated according to the algorithm of the editing.

Each user may elect to select a rich media icon, and contents therein which they would like to "publish to wall". This results in the icon and media therein being posted to the wall for others to see and engage with. The "publish to wall" button requires a valid link, such as YouTube or weblink in the related fields. The YouTube link, and similar links, requires that the user input a valid link into the field. An "Action Button" link field may also be filled with an external weblink to link 201 the user an external network as designated by the link.

In an embodiment, tags 203 may be input, separated by a comma within the specific field. Each word is a tag and must be separated by a comma to be performed properly.

It may be a requirement of the system that at least one input field be filled in order for the iCon to publish. The specific requirements may be set by the system administrator. Selecting the "upload" button will finalize the process of icon creation. As the upload button is selected, the system may verify that parameters are met in order for the content to post successfully.

In an embodiment, the user may elect to take a picture with their local device camera in order to use the image for content creation within the system. Once the user has selected the device camera option, normal camera functionalities are used including, cancel, flash, camera switch, take picture, among others as known in the arts. Once the user has taken the photo, the user is directed to a second screen with the same related functions allowing for editing to occur as desired or required.

In an embodiment, the "video gallery" option allows the user to select a video to create the icon. A video edit screen permits the user to select the length of the video. A maximum or minimum length may be required by the system. The user may navigate through a frame-by-frame interface which allows the user to easily "cut" the video as desired. In an embodiment, specific and dedicated buttons may be used to scan through frames of the video, cut, and provide additional editing tools as known in the art. In an embodiment wherein a time maximum is reached, the system creates a field for the maximum time limit and allows the user to scroll the time limit maximum through the field.

In an embodiment, the user may select a still image from the video to use as the Rich Media Icon image for display during publication. By default, this image is automatically the first frame of the video. The system may remind the user to "Choose a frame" such that the icon image is selected by the user with the intention of the iCon image being as relevant as possible.

The video embodiment, may contain similar requirements for content creation including required fields, description, external links, among others known in the art.

Technical description of Rich Media Icon Pop-Up:

In an embodiment, a plurality of controllers exists within the framework of the system allowing the user can open the related pop-up once the icon has been clicked. These may include "chat", "iCon Wall", "user's iCon wall", "Rearrange", and "edit my iCons". A specific source of the icon as an object exists for each controller source—API, Data Base. A number of procedures determine the way the data of the icon is acquired.

In an embodiment, saving the icon to the database includes the user creating an icon on a local device, then transmitting the data to be stored on a server in communication with the network. Further the user may download icons created by the user, then store on the server database. When engaging in chat functionalities, the user may send and receive an icon to another user within the system. In an embodiment, once the user receives a message containing an icon, the icon is automatically saved. Further, the user may save the icon to favorites/storage as described previously while using the icon details functionality within the pop-up.

When iCons are downloaded from the server, the system may download icons related to "most popular" or "new" from the server without saving to the local database. The user may also elect to download icons from a specific author in a similar manner. A "featured" icons API exists wherein a periodic download of a number of icons from the server occurs. This may also not save to the apps database.

Each controller has various sources of the icons. In an embodiment, the "chat controller" utilized the message database, and featured icons API. The "iCon Wall" controller uses the Icon wall API and featured iCons API. The "Users iCon Wall" controller utilizes its own API. The "rearrange" controller utilizes the saving icon to "Favorites/storage database. The edit my iCons controller utilizes a list of icons which are created by the user of the app database.

Depending on the source of the icon, a number of options define the functionalities in Rich Media Icon details pop-up. The "Chat", "iCon Wall", and "User's iCon Wall" controllers have a basic options set. The "Rearrange" controller has the button "Save" replaced by the button "move to favorite/storage" with the inherent functionality changed also. The "edit" controller results in the functionality reduced to the editing of the icon, forgoing all other functionalities.

Figure 4:
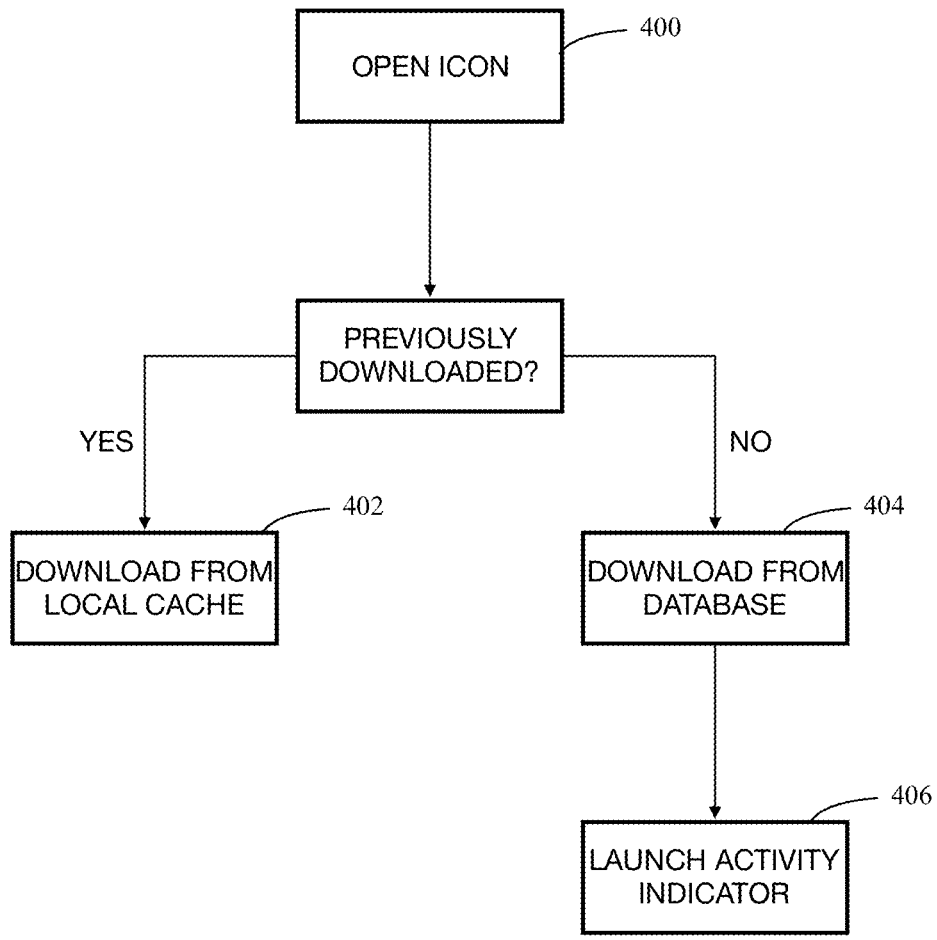
FIG. 4 illustrates a process for opening a rich media icon by a user, according to an embodiment of the present invention.

"Icon details" and "Rearrange" support the following:
video playback-use of the active weblink-access to all the icons created by the specific author-report as spam-save-share-send-close Step by step:
Opening:
In reference to FIG. 4, the user places a request to "open" an icon on their local device in step 400. This may be accomplished using selection tolls or touch screen functionality of the device. The system may determine if the icon 300 and its contents was previously downloaded. In this case, icon's image was previously downloaded and the image is downloaded from the local cache in step 402.

In the case that the icon's image was not previously downloaded, the image downloads from the server in step 404 (launching the "activity indicator" in parallel at step 406, to inform the user).

In an embodiment, a placeholder is launched for the time of the download from the server. The placeholder may be one of a plurality of content, including popular items, images, videos, advertisements, among others known in the art. The image is show upon successful download and is subsequently added to the local cash in case of the download from the server. In the case wherein a download error occurs, a pictogram indicating the error is shown. In an embodiment, kCAFilterTrilinear is used in one or more facets of the invention. The name of the category is shown and utilized based off of the identification of the iCon by the creator. In the case wherein a missing identification is used, the system defaults to a miscellaneous "other" identification. The user may add text related to the icon to the description field such that other users may consume the description of the image, the functionality may be required. Further, a name related to the icon to the author field may be added. In the case that the icon is not marked to be published to the "iCon Wall", the button with the option "Spam" is hidden from view on the API. In the case that the icon doesn't have the link to video file or Youtube, the button "Video playback" is hidden from view on the API. In the case that the icon doesn't have the weblink, the button "Go To" is hidden from view on the API. In the case that the icon was already saved to "Favorites/Storage", the button "Save" becomes disabled on the API. In the case that the icon was de-activated by the moderator, the button "share" becomes disabled on the API. At the first use of the icon, creation of a request on the server to transfer statistical info related to the use of the icon is made. Data is stored locally on the device.

"Rearrange" Functionality:

In the case that the icon was already saved to "Favorites", the button "Save" is replaced by the button "Move to Storage" in the API. In case the icon was already saved to "Storage", the button "Save" is replaced by the button "Move to Favorites" in the API.

"Video Playback" Functionality:

Opening of the video playback screen to watch video from YouTube or icon's video allows the user to watch the media either locally through the current network, or through the external network indicated by the link. At the first use of video playback a request is created on the server to transfer statistical info related to the use of the icon and video playback this data is kept locally on the device.

"Go To" Function:

As the user selects "Go To" the built in browser is opened in the system. Access to the content related to the weblink is granted to the user.

Opening of the iCon Wall with icons created by a specific author results in an opening of "iCons by: . . . " screen.

Spam Option:

When engaging with user created media, the user is provided with an action sheet with an option to mark the icon as spam. Marking an icon as spam will send a request to the server to mark the icon accordingly. The system administrator may be alerted and consulted in order to act accordingly to protect the user experience.

"Save" Functionality:

The user is provided with an action sheet with a choice to choose "Favorites" or "Storage" to save the icon on the API. Once selected the icon becomes saved to the data base of the app to the related category within the API.

"Send" Functionality:

As the user selects the "Send" option, the contacts screen is opened allowing the user to choose a contact registered in the system to send the icon in a message in chat. Functionality thereon is described above.

"Share" Functionality:

As the user selects the "Share" option, the user is provided with an action sheet with a choice where to publish the icon.

In an embodiment wherein the user wishes to publish to Facebook or similar external network the following may occur. The user requesting Facebook SDK publishing occurs. Publishing to Instagram or similar network may include requesting the modal menu to choose the publishing method.

"Close" Functionality:

As the user selects the "Close" option, the Rich Media Icon pop-up is closed, and the user is brought back to a previous screen as determined by the system.

"Edit" Functionality:

In an embodiment, "Edit" and "Close" functionalities are supported therein. The user may open the modular "Icon Description Controller" screen to edit the related fields as described above. Further the user may update the current parameters of the icon as known in the art and described above.

In an embodiment, as the user select the "Close" option, this results in closing the Rich Media Icon Edit pop-up screen and returning the user to a previous screen.

Technical Description of Icon Creation

In an embodiment, creation of an icon starts with clicking on "Create iCon" button. The user is shown a modal Action Sheet with a list of media data sources. In general, there are three paths to create an icon, depending on the type and source of the media data. These include, Camera, Photo Library, and Video Library. Each may contain a plurality of controllers including; UI image picker, create icon camera view, select image area view controller, crop image view controller, icon description, and video cut controllers.

Figure 5:
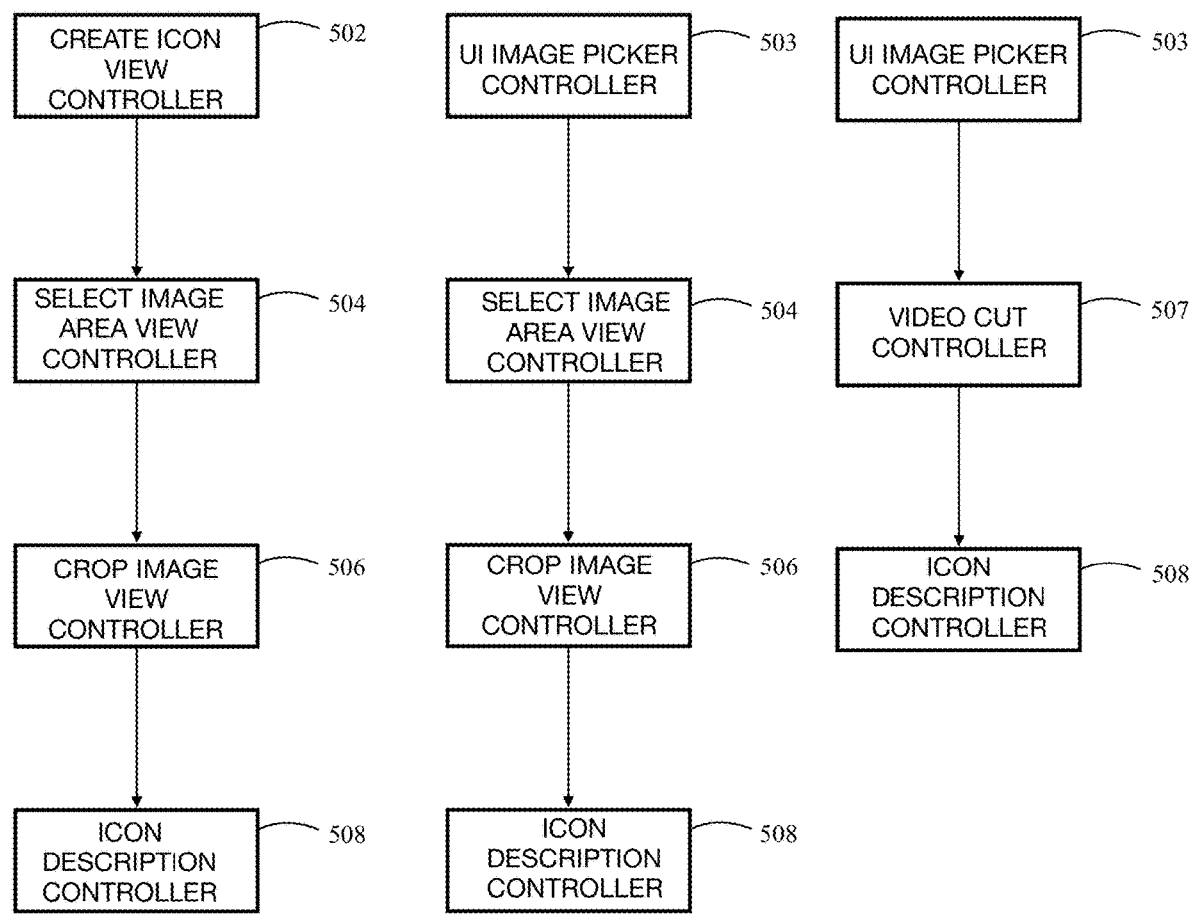
FIG. 5 illustrates a sequence of controller presentation, according to an embodiment of the present invention.

In reference to FIG. 5, a sequence of controllers is presented. The system of controllers includes the following: Create Icon Camera View Controller 502, Select Image Area View Controller 504, (Optional) Crop Image View Controller 506, Icon Description Controller 508, Also included are: UI Image Picker Controller 503, Select Image Area View Controller 504, (Optional) Crop Image View Controller 506, and Icon Description Controller 508.

Further, a UI Image Picker Controller 503, Video Cut Controller 507, and Icon Description Controller 508.

UI Image Picker Controller Operation:

The UI image picker controller acts as a system controller to choose a media file from user's gallery. It also serves to adjust video including the functionality of cutting the video to adhere to a system mandated time limit, such as a 60 second limit. As the user makes a choice of the media file, files transfer as a parameter to the next controller—Select Image Area View Controller/Video Cut Controller—in this case.

Create Icon Camera View Controller Description:

In an embodiment, the AVFoundation.framework is utilized. Supported functionalities therein may include; Take a picture, Change flash mode (on/off), Change camera (front/rear), Change focus, and Cancel (Ends icon creation process) among others known in the art.

First, initialization of the controller is performed. Access to the camera is verified and a data capture session is created (AVCaptureSession). An image output interface is then created (AVCaptureStillImageOutput).

If access is not defined—Request to access the camera
        If access is restricted—alert is shown, informing about the lack of access
        If access is allowed—start of camera initialization Camera initialization
>Configuration in charge of the quality of the session is preset (AV Capture Session Preset High)
>Additional check to access the camera
>If access allowed—registration of the accessible cameras (front/rear)
>If access is not allowed—switch of functional buttons (flash, switch camera)
>Filtration based on the support of the video flow
>If rear camera is accessible—it becomes active by default
>Flash button becomes accessible based on the accessibility of the flash by default
>Start of the camera session creation Creation of the camera session
>Focus configuration ("continuousAutoFocus" by default)
>Creation of media data capture interface by default
>Adding of the interface to the media data capture session
>Adjustment of the image output interface (codec AV Video Codec JPEG)
>Creation of the real-time image output on the screen based on the capture session
>Launch of the session Transition to the next controller
>Creation of the session to transfer to the next controller (Select Image Area View Controller)
>Transfer of the captured image from the camera Camera change
>Transfer of the capture session to the configuration mode
>Removing of the current media data capture interface
>Replacement of the default camera to the opposite
>Flash button becomes available, depending on the initial flash accessibility by default.
>Creation of media data capture interface by default
>Addition of the interface to the media data capture session
>Switch of the capture session to the active mode Switch of flash mode
>Capture by default
>Checking flash function accessibility
>Switch by default to the configuration mode
>Camera mode switch to the opposite (on/off)
>Change of the flash button icon based on the implemented mode
>Switch by default in active mode Focus
>Definition of user's touch positioning at the start/moving of the touch
>Capture by definition
>Switch by definition to configuration mode
>Check of the focus access
>I case focus is accessible—definition of the focus point
>Switch by default in active mode
>Animation of the appearance, moving and disappearance of the focus point Image capture
>Media date capture
>Orientation of image output, depending on the turning of the device
>Asynchronous data capture from output interface
>Data conversion to JPEG
>Transition to the next controller Select Image Area View Controller Description:

In an embodiment, the user may elect to select the image area view controller containing various functionality therein. Supported functionality may include; Move the image, Change image scale, Choose shape template, Hand cut mode, Next (transition to the next controller), Cancel (return to the previous controller).

Procedures:

Initialization of the controller
>Pre-download of the shape templates to Collection View (square, circle, heart, cloud, speech bubble, star)
>Choice of the first template in the list (square) by default
>Implementation of settings reflecting initial image (flexible Width, flexible Height)
>Transfer of the image from the previous controller to be reflected on the screen
>At first launch—appearance of the hint window of the current controller
>Initialization of the empty icon description object to further keep the renewed information in case of the transfer to the current controller from the Icon Description Controller Transition to the next controller
>Creation of the session to transfer to the next controller (Icon Description Controller/Crop Image View Controller)
>Transfer of the results using shape cut
>Transfer of the object of the icon description Transition to the previous controller
>Creation of the session to transfer to the previous controller (UI Image Picker Controller/Create Icon Camera View Controller). This allows the user to cycle through controllers.

Image Moving

Touch positioning capture allows the user to position the selection over a piece of the image. Moving the initial center of the image in accordance with the touch positioning allows the user to select the specific point of the image they wish to be displayed when published.

Changing Image's Scale:

The system captures the scale of the image and checks the scale in relation to the maximum allowed (in case passes the borders—maximum allowed scale is set). The system may have predetermined maximum and/or minimum parameters. Further, change of the initial size and positioning in correlation with the scale may occur.

Choice of the Shape Template

The user is permitted to capture the outline of the chosen template. This may require turning on/off of the hand button depending if the square shape is chosen or not and drawing the template outline on the image, reflecting the crop outline to gain the template shape of choice.

Application of the Cut Outline

The system calculates the size and positioning of the square outline to cut the initial image depending on repositioning and scaling of the initial image. Further the context is created to draw the outline. Further, filling of the context with default color (White) with spacing of 10 dp for the frame may occur. The user may Draw the chosen outline in the context. The outline image is capture from the context and created to draw the cropped image. In an embodiment, drawing of the image in consideration with the calculated outline. The cut image is captured from the context and the application utilizes the outline crop with the resulting image. Further, outline borders are drawn on the resulting image.

Transition to the Manual Cut Mode:
  During transition to the manual cut mode, the application of the square shape outline is automatically utilized, and the user is transitioned to the next controller (Crop Image View Controller).
Crop Image View Controller:
  During use of the crop image view controller, OpenCV Library is utilized and the modal of image processing and crop is permitted. Supported functionality of the crop image includes; Drawing, Change outline thickness, Change the distance of the outline drawing from the touch area, Crop, Undo, Next (transit to the next controller), and Cancel (transit to the previous controller).
Procedures:
  Initialization of the controller
    Initialization of the Lasso Cropper module
    Initial deactivation of "Undo" and "Crop" buttons
    Transfer of the image from the previous controller as an attribute to Lasso Cropper
    At first launch—outline thickness and the distance of the outline drawing from the touch area settings are set by default. Also, in case settings are changed, these settings are saved for following uses.
    At the next launch the above mentioned settings are set as in the last save.
  Changing outline thickness
    Capture of the parameter from UI Slider marking this attribute and transfer of the parameter to Lasso Cropper
    Saving the parameter for the following repeated use
  Changing the distance of the outline drawing from the touch area
    Capture of the parameter from UI Slider marking this attribute and transfer of the parameter to Lasso Cropper
    Saving the parameter for the following repeated use
  Transition to the next controller
    Creation of the session to transfer to the next controller (Icon Description Controller)
    Transfer as a parameter of the result of cropping application
    Transfer as a parameter of an object of the icon description
  Transition to the previous controller
    Creation of the session to transfer to the previous controller (Select Image Area View Controller)
    Transfer as a parameter of an object of the icon description
Lasso Cropper procedures:
Module initialization in relation to the lasso cropper;
  Initialization of the basic drawing context
  Drawing in the context of the image received from the previous controller
  Brush creation
  Array of curves creation
  Array of hidden areas creation
  Array of new areas creation
  Array of actions creation
Regeneration of the basic context of the drawing
  Re-drawing of the initial image in the context
  Drawing of all the curves from the array of curves, if there are any
  Removing from the image of all the hidden areas from the related array, if there are any
Drawing;
Working with touching
1. Touching has started
   Capture of the positioning of the previous touching using the attribute of remoteness
   Capture of the current touching using the attribute of remoteness
   Setting the size of the brush depending on the attribute of the outline thickness
   Setting brush positioning on the captured position of the current touching using the attribute of remoteness
   Displaying the brush
   Creation of the curve for drawing
   Drawing the current state of the curve
2. Touching has been moved
   Capture of the positioning of the previous touching using the attribute of remoteness
   Capture of the current touching using the attribute of remoteness
   Setting brush positioning on the captured position of the current touching using the attribute of remoteness
   Changing the curve of drawing by way of adding a new line segment between the previous and the current touch
   Drawing the current state of the curve
3. Drawing has stopped
   Removing of the brush drawing
   Adding and saving the drawn curve to the array of curves
   Saving the performed action data to the array of actions
   Retrieving the image of the curve from the basic context
   Scanning the content for closed loops
   Saving closed loops that were found to the array of new areas
   Changing the status of "Undo" button depending on the number of elements in the array of actions
   Changing the status of "Crop" button depending on whether closed loops were found or not
Crop
In the case wherein there are more than one area in the army of the new areas, the following points are applied:
  If it's the first crop, the size of the area in the center of the image is increased 3 times. Simultaneously, the size of the external embedded outline (if there is any) is reduced 3 times.
  All reads, except for the largest one, are hidden. All the hidden areas are moved from the array of new areas to the array of hidden areas
  Saving the status of the hidden areas to the array of actions
  Removal from the image of the areas from the array of new areas
  Changing the status of the "Undo" button depending of the number of elements in the array of actions
Undo previous action
  Removing the last element from the array of actions
  Changing the status of the "Undo" button depending of the number of elements in the array of actions
  If last action is drawing—removing last element from the array of curves
  If last action is cropping—restoring the status of the hidden areas from the previous element from the array of actions
  Regeneration of the basic context of the drawing
Icon Description Controller
Supported functionality:
  Editing icon description (maximum 10,000 characters)
  Changing local category to save a new icon (Favorites, Storage)

Changing the option to publish icon to the iCon Wall
Editing YouTube link (only if icon was created from an image)
Editing weblink
Editing tags
Choice of category for the icon
Cancel (transit to the previous controller)
Upload (saving and icon download to the server, moving user to the controller, depending if icon was published on the iCon Wall or not)

The Icon description controller permits the user to access, edit, and engage with content within the rich media icon. Functionality mentioned herein may be utilized by the user creating or intaking the data.

Figure 6:
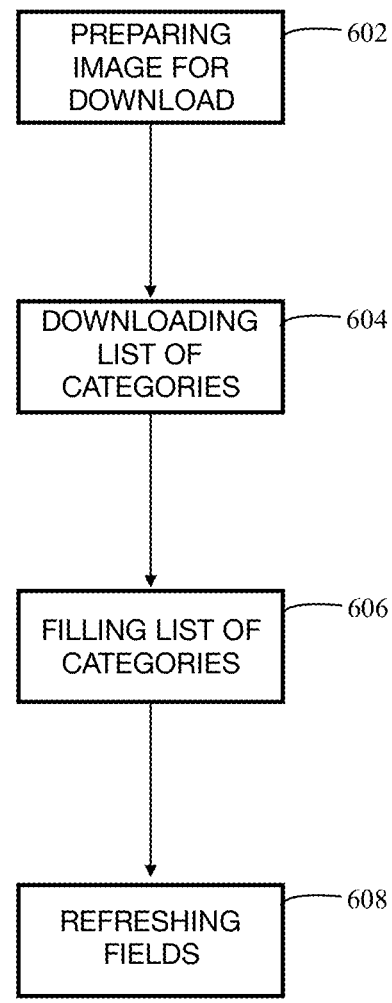
FIG. 6 illustrates a process for downloading categories and filling fields, according to an embodiment of the present invention.

Procedures:

Relating to FIG. 6, controller initialization may occur by the following:
Preparing the image for download 602 (filling empty areas with #FFFFF2 color, rounding the angles, converting the image to JPEG)
Downloading the list of categories 604 that were previously downloaded from the server
Filling the list of categories 606
Refreshing all fields 608 in relation to the data from the icon description from the previous controller
At first launch—appearance of the hint window of the current controller The user may change the local category to save a new icon (Favorites, Storage). Upon upload, the icon will be saved to the chosen category in the app for further use and engagement.

In an embodiment, the user may select the option to publish icon to the iCon Wall. In case the icon (created from an image) has a YouTube link or the icon (created from either an image or video) has a weblink—user can mark the option to publish the icon to the iCon Wall.

Editing YouTube link:
YouTube link can be edited only if the icon was created from an image (not from a video). Otherwise the YouTube editing field will be hidden The user may elect to editing tags, herein the Tags are edited with key words related to the content of the icon, placed with a coma such that each word—tag—is separated by a coma. This allows the system to identify tags.

Choice of Category for the Icon:
Clicking on area of "category choice" will provide user with extensible UI Picker View with pre-filled categories which may be provided by the system, or provided by the users within the network as categories are created. Repeated clicking on area of "category choice" will close UI Picker View with pre-filled categories Transition to the previous controller results in saving data from all fields to the object of icon description followed by the creation of the session to transit to previous controller (Crop Image View Controller/Select Image Area View Controller/Video Cut Controller). Transfer is an object parameter of icon description.

Figure 7:
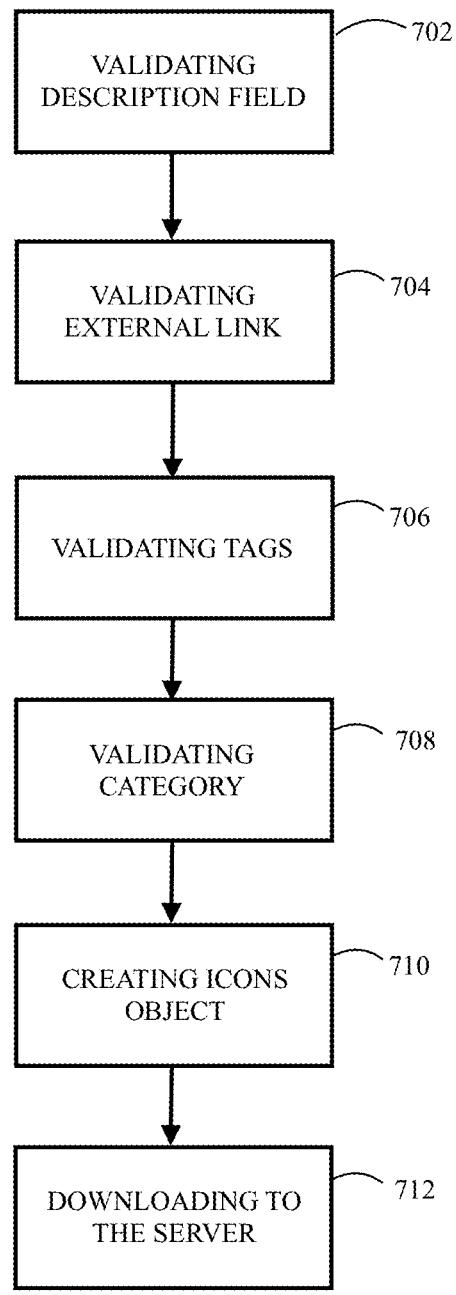
FIG. 7 illustrates a process for uploading content by a user, according to an embodiment of the present invention.

In reference to FIG. 7, uploading may comprise the following steps;
Validation of description field 702 (this field can't be empty)
Validation of YouTube or external link 704
Validation of tags 706 (in case the icon marked for publishing on iCon Wall)—this filed can't be empty
Validation of the category 708—a category must be chosen
Creation of icon's object 710 to download to the server
Filling icon's object with data from the related fields and attaching the image media file and video file (if available)
Downloading icon's object to the server 712
Upon termination of a successful download, user is redirected to the "iCon Wall" screen (if the icon was marked for publication to the iCon Wall. If not, user is redirected to "Chats" screen
In case an error happens during download—a related alert is shown to the user Video Cut Controller:
The video cut controller may utilize AVFoundation. framework and AssetsLibrary framework in an embodiment of the present invention. Supported functionality may include: Change of timing position to extract the frame, Next (transit to the next controller), and Cancel (transit to the previous controller)

Figure 8:
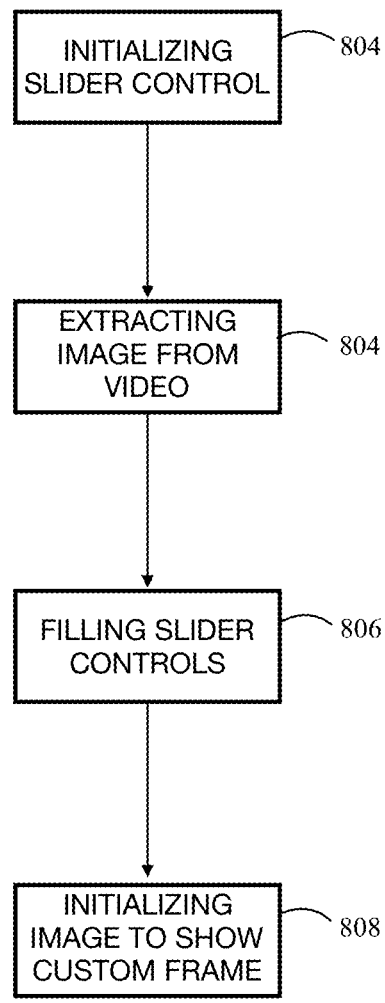
FIG. 8 illustrates a process for editing an image frame, according to an embodiment of the present invention.
Figure 9:
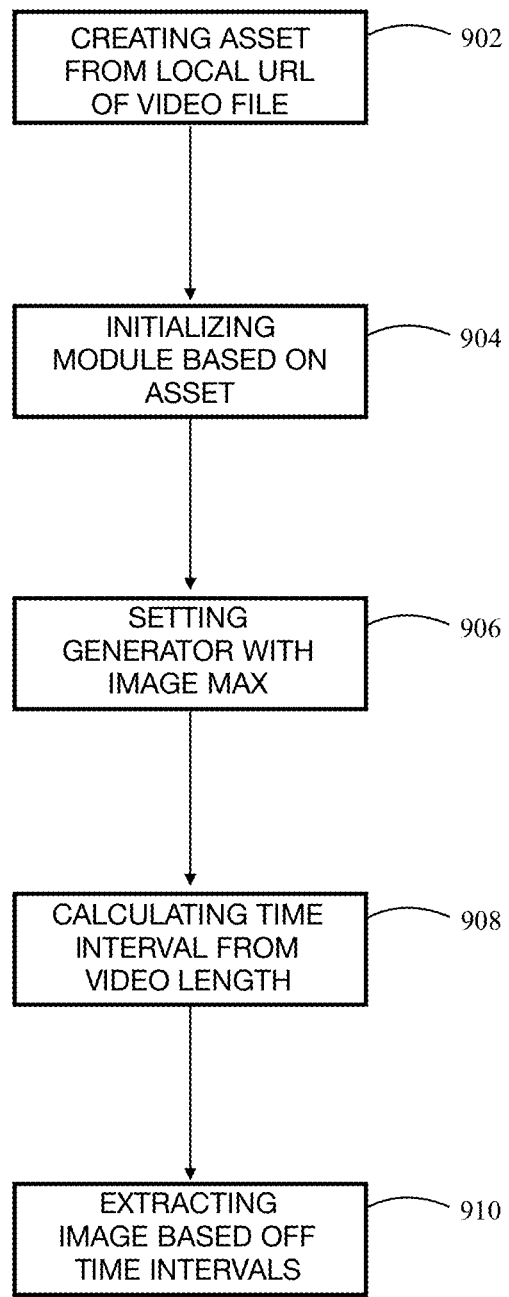
FIG. 9 illustrates a process for image extraction from a video stream, according to an embodiment of the present invention.

In reference to FIG. 8, procedures may occur as follows:
Controller initialization
Initialization of the slider's control 802
Image extraction from the video 804 stream with equal intervals of time (5 images)
Filling slider's control 806 with the generated images
Initialization 808 of the AVPlayer object to show the chosen frame with the help of slider's control
Initialization of an empty icon description object to keep the updated information in case of a transit to this controller from Icon Description Controller In reference to FIG. 9, image extraction from the video stream occurs by the following:
Asset creation 902 from the local URL of the received video file
Initialization of AVAssetImageGenerator module based on the created Asset 904
Setting generator with image's maximum size 906
In case timing is not specified, time intervals to extract images from the video stream are calculated 908 based on the length of the video file
Image extraction 910 based on the specified timing or calculated time intervals
Transit to the previous controller
Creation of the session to transfer to the previous controller (UI Image Picker Controller) Transit to the next controller
Creation of the session to transfer to Icon Description Controller
Transfer (as a parameter) of the results of the cut and export (path to the file)
Transfer (as a parameter) of the results of the image extraction from the video stream
Transfer (as a parameter) of the icon description object
Changing timing positioning to extract the frame
Value capture from the slider
Value transfer to AVPlayer object to show the related frame
Video file export to the storage
Asset creation from the local URL of the received video file
Generation of a unique name for the video file
Generation of a full address to save the file based on the name and address of the temporary directory (NSTemporaryDirectory)

Initialization of the export session (AVAssetExportSession) based on the Asset with quality parameter (AVAssetExportPresetMediumQuality)

Transfer of the full address session to save the file

Transfer of the file optimization flag session for network use

Asynchronous export of the file

Save

Image extraction from the video stream based on the specific time parameter set on the slider Video file export to the storage Transit to the next controller Aspects of the invention may include and be implemented by specialized software executing in one or more computer system including general-purpose computer system, which may include a processor, in operable communication with at least one memory device. The memory device may include a disk drive, solid-state memory, or similar device for the storage of data. Memory is typically utilized for storing data during operation of the computer system.

Components of computer system may be coupled by an interconnection mechanism such as network, which may include one or more busses (e.g., between components that are integrated within a same machine) and/or a network (e.g., between components that reside on separate discrete machines). The interconnections mechanism enables communications to be exchanged between system components of system.

The computer system also includes a plurality of input/output ("I/O") devices such as a keyboard, mouse, trackball, microphone, touch screen, printing device, display screen, speaker, among other I/O devices commonly associated with the arts. In addition, the system includes one or more network connection devices that connect the computer system to a communication network in addition to, or as an alternative of, the network.

A storage system includes a computer readable and writeable nonvolatile recording medium in which signals are stored that define a program to be executed by the processor as well as information to be processed by the program installed thereon. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in the storage system, as shown, or in memory system. The processor generally manipulates the data within the memory, and then copies the data to the medium associated with storage after processing is completed. A variety of mechanisms are known for managing data movement between the medium and integrated circuit memory element and the invention is not limited thereto. The invention is not limited to a particular memory system or storage system. In one example, content may be stored on computer readable medium, as well as graphical indicators for content, targeting criteria may be stored as well, among other options. The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the system may be distributed across one or more systems coupled to a communications network. These systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A system for creating and presenting rich media icons comprising:
   a personal electronic device in communication with a network including at least one server, at least one memory, and at least one processor, wherein the at least one memory is coupled to the at least one processor, wherein the at least one processor is configured to:
   receive an image;
   apply the image to an index of images;
   a user in communication with the personal electronic device, the user performing the steps of:
   creating a media file;
   generating a plurality of content;
   associating the plurality of content with the media file;
   indexing the media file in the memory, wherein indexing permits the media file and the plurality of content to be searchable by a community of users, a graphical user interface displayed to the community of users, wherein the graphical user interface is comprised of a plurality of selectable rich media icons to permit the user engagement with the plurality of content, wherein the rich media icons are categorically or hierarchically organized on the user interface;
a content creation module configured to perform the steps of:
creating an asset from a local URL of a video file
initializing a module based on the asset;
setting a generator with an image maximum;
calculating a time interval from the video file length; and
extracting an image based on time the time interval, wherein the extracted image is displayed on the rich media icon; and
a crop image view controller to allow the user to crop the image view of the extracted image,
wherein in image uploader performs the steps of:
  validating a description field;
  validating an external link;
  validating one or more tags;
  validating one or more categories;
  creating the rich media icons; and
  downloading the rich media icons to the server;
wherein the processor performs the steps of;
  initializing a slider control;
  extracting the image from a video;
  filling the slider control;
  initializing the image to show a custom frame.

* * * * *